United States Patent Office 2,848,438
Patented Aug. 19, 1958

2,848,438

AMINE-FORMALDEHYDE RESINS

Earl W. Gluesenkamp, Dayton, Ohio, assignor to Monsanto Chemical Company, St. Louis, Mo., a corporation of Delaware No Drawing. Application March 22, 1954
Serial No. 417,975

11 Claims. (Cl. 260—72)

This invention relates to a new type of formaldehyde-amine resin. In some of its aspects the invention relates to monomeric and polymeric products obtained by reaction of formaldehyde, with or without alcohols, with a certain type of amine body.

The essence of this invention resides in the use of the tetramer of hydrogen cyanide, hereinafter called HCN-tetramer, to react with formaldehyde. There results a methylolated derivative of HCN-tretramer. This product can be further reacted with a lower alkanol, e. g., methanol, butanol, etc., forming the corresponding alkyl ether of the methylol derivative of HCN-tetramer. Further condensation reaction of the methylolated HCN-tetramer and/or of the ether derivative thereof, results in the production of a variety of resinous materials. Such resins, depending upon their composition, the ratios of reactants employed in forming them, the particular alcohol, if any, used in the etherification, and the various reaction conditions and condensation polymerization conditions, find use in a variety of ways in which presently urea-formaldehyde resins and especially melamine-formaldehyde resins are employed.

In one embodiment of the invention, the methyl ether of methylolated HCN-tetramer is employed as an anti-shrink agent on fabrics.

Hydrogen cyanide (HCN) can be polymerized, and among the possible products is the material known in the art as HCN-tetramer. Ordinarily HCN-tetramer is separated from a total polymerization product obtained from heating HCN in the presence of a suitable catalyst, e. g., KCN or amines. HCN-tetramer has the empirical formula $H_4C_4N_4$. It is generally called diaminomaleinitrile. The formula for diaminomaleinitrile can be indicated in the following manner:

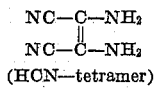
(HCN—tetramer)

The name, diaminomaleinitrile, is generally used in the art. However, it has been stated in the art that there is evidence the compound usually reacts as the imino-modification.

It will be apparent from the foregoing discussion that the present invention has several aspects. An essential step in all of the aspects of the invention involves reaction of HCN-tetramer with formaldehyde. The quantity of formaldehyde employed should be at least one (1) mole per mole of HCN-tetramer, and can advantageously range up to 4 moles formaldehyde per mole of HCN-tetramer. The reaction is considered to be a methylolation, and where four (4) moles formaldehyde is reacted with one mole HCN-tetramer can be represented as follows:

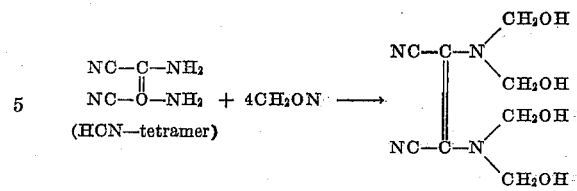

Use of less than four (4) moles formaldehyde per mole of HCN-tetramer results in a product similar to that indicated, but with fewer —$CH_2OH$ groups in the molecule; in other words the molecule retains residual amino hydrogen atoms. As a practical matter, in the absence of sufficient formaldehyde and reaction conditions forcing the reaction to the formation of a tetra-methylolated product, a mixture of products is obtained varying in the position and number of —$CH_2OH$ groups from molecule to molecule. The various compounds that can be formed are designated methylol diaminomaleinitriles.

The reaction of HCN-tetramer with formaldehyde should be conducted at neutral or alkaline conditions. The reaction is advantageously effected in water, or in other liquid media. A preferred procedure is to react HCN-tetramer with the chosen quantity of formaldehyde in a liquid medium comprising water and a lower alkanol, especially methanol, the pH ranging from 7 upwards and preferably not above 10 or 11. The type of product obtained is considerably dependent upon the reaction medium and conditions. Thus, in the presence of water without an added alcohol, the reaction continues until an insoluble, hard and crumbly resin separates from the reaction mixture. Such resin is called herein a poly-(methylol diaminomaleinitrile). The reaction occurs readily at room temperature, and even more readily at temperatures above room temperature, e. g., up to 100° C. The same type of resinous product appears to be produced even though the quantity of water present be varied over a considerable range. If an alcohol is also present, reaction occurs, but with less evolution of heat, and the product is soluble in the water-alcohol system so that a solution is obtained, rather than a precipitated resin.

It is preferred that the methylolated HCN-tetramer be subjected to further reaction with a lower aliphatic alcohol, e. g., methanol, ethanol, n-propanol, isopropanol, n-butanol, sec.-butanol, iso-butanol, tert.-butanol, the various amyl alcohols, or the like. This reaction is preferably effected in an acidic medium, and involves an etherification, forming alkoxymethyldiaminomaleinitriles. Using methanol as a representative and preferred alcohol, and the tetramethylol diaminomaleinitrile, the reaction is represented by the following equation.

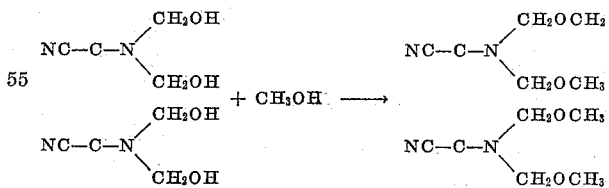

It is usually most desirable to employ a stoichiometric excess of the alcohol, which then acts as a solvent and reaction medium. While the reaction may go to completion forming a methoxymethyl group for every methylol group in the starting molecule of the methylolated HCN-tetramer, it will often be permissible and even desired to etherify only a portion of the methylol groups.

It will also be recalled that the tetramethylolated product is only one of those obtainable by reaction of HCN-tetramer with formaldehyde, and that reaction products can also be obtained retaining some of the amino hydrogen atoms present in the original HCN-tetramer. Thus, the overall process, involving first reaction of HCN-tetramer with formaldehyde, and then reaction of the product with an alcohol, can be represented generically in the following manner:

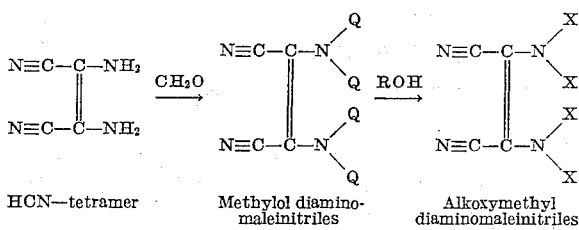

HCN—tetramer    Methylol diamino-    Alkoxymethyl
                maleinitriles        diaminomaleinitriles in which each Q is selected from the class consisting of —H and —CH$_2$OH and at least one Q is CH$_2$OH, and in which each X is selected from the class consisting of (a) —H, (b) —CH$_2$OH, and (c) —CH$_2$OR wherein R is a lower alkyl radical, and at least one X is a —CH$_2$OR.

As a general guide, the following description of suitable procedures is provided. HCN-tetramer and formaldehyde, as formalin, in mole ratios of say 1:2 to 1:6 are reacted in an alkaline reacting aqueous solution at a temperature between room temperature and 90° C. The mixture is made alkaline reacting, for example, by the addition of fixed alkalies such as sodium hydroxide, soda ash or the like. After the condensation reaction between HCN-tetramer and formaldehyde has occured, the resulting methylol diaminomaleinitrile may be present largely as an insoluble material or partially or completely dissolved depending on the reaction medium and conditions and reaction period. Methanol can then be added to the reaction mixture for the purpose of forming the methyl ether. Part or all of the methanol may be present in the alkaline-reacting liquid during the first step of the process. In general, it is convenient to use from say 10 to 40 or more moles of methanol per mole of HCN-tetramer initially employed. The mixture is then acidified to a pH between about 2 and 5 with a strong mineral acid, such as phosphoric acid, hydrochloric acid and the like. This mixture is maintained at a temperature between room temperature on up to 60 to 100° C., depending upon the extent of etherification desired. Here again, the methoxymethyl diaminomaleinitrile product may be soluble or insoluble depending upon the reaction system. The etherification reaction can be stopped by neutralization to a pH of 7, as with a fixed alkali such as KOH, NaOH, Na$_2$CO$_3$, and the like.

In preferred modifications of the invention, an alkoxymethyl diaminomaleinitrile, which will usually be a mixture of compounds, is prepared by reaction between HCN-tetramer, formaldehyde, and a lower alkanol, and is subjected to condensation polymerization by heating to produce a hard insoluble resinous poly(alkoxymethyl diaminomaleinitrile) product. It is believed that such resin involves a combination of numerous individual molecules, joined together largely through methylene bridges. These methylene bridges are probably between nitrogen atoms, and between oxygen atoms. Further, the reactions probably do not always proceed with the great simplicity indicated by the simplified reaction set forth hereinabove, but rather a certain amount of condensation polymerization may take place even in the first step giving low molecular weight polymeric products by bridging through methylene groups. The same type of reaction may occur to a considerable extent during the etherification reaction of methylol diaminomaleinitriles with an alcohol. Where a final high molecular weight resin is desired, the final condensation polymerization is preferably effected by heating, in the absence of free acid. The condensation to a high molecular weight insoluble resin can also be effected by heating in the presence of an acid. If the resin is used to impregnate fabrics, the treated fabric should, after the heating step, be washed to remove any free acid therefrom. Any such final heating step can be effected in general at temperatures within the range of 100 to 200° C., and for periods of time ranging from a few minutes up to approximately an hour, the shorter heating periods being used at the higher temperatures. When molded articles are to be made, the partially polymerized resinous material is separated from liquid, e. g., methanol, methanol-water, etc., by any conventional means such as spray drying or otherwise heating in a vacuum at a temperature and time sufficiently low to avoid complete condensation polymerization. The resulting solids then constitute a thermo-setting resin. It can be formulated by any of the various procedures, including use of fillers, plasticizers, pigments and the like which are well known in the art for aminoplast resins. The product is then placed in a suitable mold and heated therein under pressure at conditions similar to those stated hereinbefore for the final heating step, resulting in further condensation polymerization with the formation of a hard insoluble molded resin.

Where the resins of the present invention are to be applied to fabrics, the fabric, containing cellulosic yarns such as cotton yarns or regenerated cellulose yarns such as viscose or cuprammonium rayon, or containing wool or other animal yarns, is treated with a liquid solution or suspension of partially polymerized methylol diaminomaleinitriles, or preferably methoxymethyl diaminomaleinitriles. The amount of solution or suspension and the concentration thereof, applied to the fabric is adjusted so as to deposit from 1 to 12 percent by weight of the condensation product, based on the weight of fabric. In some instances, a low molecular weight organic acid, e. g., acetic acid, hydroxy acetic (glycollic acid), or formic acid, can be added to the liquid solution or suspension of condensation product and the mixture allowed to age from one to several hours prior to the treatment of fabric. In such case, the treated fabric, after the final insolubilization of the resin obtained by heating, should be thoroughly washed to remove any free acid. Ordinarily fabric is treated, but yarns and threads can be treated prior to weaving same into fabric. After the fabric has been impregnated with the material, for example by dipping the fabric in a bath or by continuously running it through a bath, the fabric can then be extracted by passing it through mangle or pad rolls to adjust the quantity of resinous material thereon to the desired value. The fabric is then dried and the condensation product insolubilized on the fabric by heating at relatively low temperatures, for example from 100 to 200° C. The period of heating should be short, a matter of a few minutes or in any event less than one hour. This final heating step effects a final condensation polymerization of the material in situ, and the resulting fabric is more resistant to shrinkage than prior to the treatment, i. e., the fabric has increased dimensional stability. The treatment can be applied to dyed or undyed fabrics.

The following example illustrates one embodiment of the invention, and details are given of suitable procedures, conditions and quantities of materials to use. It will be understood of course that many variations from these exact details can be made in practicing the invention.

*Example*

The following quantities of material were used:

| | Grams | Moles |
|---|---|---|
| HCN-Tetramer | 10.8 | 0.1. |
| Methanol | 40 | 1.25. |
| Formalin (37% CH$_2$O) | 23.7 | 0.29 mole formaldehyde. |

The considerable excess of methanol employed inhibited the methylolation reaction of formaldehyde with HCN-tetramer to a considerable extent over that which would occur with a lesser quantity of methanol present.

The tetramer was slurried in all of the methanol, and was adjusted to a pH of 7.3 with 2 drops of $\frac{1}{10}$ N NaOH. The formalin was adjusted to pH 7.3 and then was stirred into the slurry. The pH of the resultant solution was 6.05, and when no evidence of reaction occurred within seven minutes, the pH was adjusted gradually upwards. At pH 6.6, a deeper orange color became evident and the amount of solids decreased, while a 2° C. rise in temperature was recorded (25 to 27° C.). The pH was then adjusted to 7.0, and at 14 minutes from the formalin addition, a temperature of 30° C. had been reached, with no tetramer crystals evident. The pH was again adjusted upward to 8.1 and in the next six minutes a peak temperature of 33° C. was attained. At this point the reaction mixture was a clear, deep red solution.

After acidification to pH 4.0 with HCl, the temperature rose gradually to 36° C., and remained there until 29 minutes had elapsed since the formalin addition. The product here was a very deep red, clear solution. This solution was then neutralized to a pH of 8.2, and allowed to stand for ten minutes, still as a clear, deep red solution.

A sample of viscose fabric was prepared for treatment, and the reaction mixture was diluted with water to a volume of 200 ml., whereupon an orange precipitate started to form. The fabric was immersed immediately, framed, dried, and cured by heating and then given a standard cotton wash along with an untreated sample.

The total percent shrinkages obtained were as follows:

|  | Treated | | Control | |
| --- | --- | --- | --- | --- |
|  | Warp | Fill | Warp | Fill |
| Percent Shrinkage | 13.9 | 8.3 | 20.5 | 12.0 |

While the invention has been described with particular reference to various preferred embodiments thereof, it will be appreciated that numerous modifications and variations are possible without departing from the invention.

I claim:

1. Monomeric condensation products of HCN-tetramer and at least one mole formaldehyde per mole HCN-tetramer.

2. Polymeric condensation products of HCN-tetramer and at least one mole formaldehyde per mole HCN-tetramer.

3. A thermosetting resinous condensation polymer of HCN-tetramer and at least one mole formaldehyde per mole HCN-tetramer.

4. Monomeric condensation products of HCN-tetramer, at least one mole formaldehyde per mole HCN-tetramer, and methanol.

5. Polymeric condensation products of HCN-tetramer, at least one mole formaldehyde per mole HCN-tetramer, and methanol.

6. A thermosetting resinous condensation polymer of HCN-tetramer, at least one mole formaldehyde per mole HCN-tetramer, and methanol.

7. Monomeric condensation products of HCN-tetramer, at least one mole formaldehyde per mole HCN-tetramer, and a lower alkanol.

8. Polymeric condensation products of HCN-tetramer, at least one mole formaldehyde per mole HCN-tetramer, and a lower alkanol.

9. A thermosetting resinous condensation polymer of HCN-tetramer, at least one mole formaldehyde per mole HCN-tetramer, and a lower alkanol.

10. A fabric comprising yarns selected from the class consisting of cellulosic yarns and animal yarns, treated with a resinous condensation polymer of HCN-tetramer, at least one mole formaldehyde per mole HCN-tetramer, and methanol.

11. A process for treating a cellulosic fabric to improve its shrink resistance, which comprises: (a) wetting same with a liquid medium prepared by first condensing HCN-tetramer with at least one mole formaldehyde per mole HCN-tetramer in an alkaline liquid, then condensing the resulting material with methanol in an acidic liquid, then neutralizing the resulting material to a pH of at least 7, then diluting same with water to form said liquid medium; (b) thereafter heating said wetted fabric to cure the HCN-tetramer-formaldehyde-methanol resin thereon.

References Cited in the file of this patent

UNITED STATES PATENTS 2,710,851   Boyd _____ June 14, 1955

OTHER REFERENCES

Hinkel et al.: Jour. Chem. Soc., London (1937), pp. 1432–1437.

UNITED STATES PATENT OFFICE
Certificate of Correction

August 19, 1958

Patent No. 2,848,438

Earl W. Gluesenkamp

It is hereby certified that error appears in the printed specification of the above numbered patent requiring correction and that the said Letters Patent should read as corrected below.

Column 2, line 56, for the left-hand portion of the formula reading
$+CH_3OH\rightarrow$ read $-+4CH_3OH\rightarrow-$ Signed and sealed this 2nd day of June 1959.

[SEAL]

Attest:
KARL H. AXLINE,
*Attesting Officer.*

ROBERT C. WATSON,
*Commissioner of Patents.*